US006040035A

United States Patent [19]
Satoh et al.

[11] Patent Number: 6,040,035
[45] Date of Patent: Mar. 21, 2000

[54] WATER-COLOR INK ABSORBING MATERIAL AND LAMINATED FILM HAVING LAYER OF THE ABSORBING MATERIAL

[75] Inventors: Hiroki Satoh; Yoshio Taguchi; Noriko Shoyama, all of Kobe, Japan

[73] Assignee: Bando Chemical Industries, Ltd., Kobe, Japan

[21] Appl. No.: 09/101,191

[22] PCT Filed: Nov. 5, 1997

[86] PCT No.: PCT/JP97/04032

§ 371 Date: Jul. 10, 1998

§ 102(e) Date: Jul. 10, 1998

[87] PCT Pub. No.: WO98/21048

PCT Pub. Date: May 22, 1998

[30] Foreign Application Priority Data

| | | | |
|---|---|---|---|
| Nov. 11, 1996 | [JP] | Japan | 8-298431 |
| Nov. 11, 1996 | [JP] | Japan | 8-298434 |
| Mar. 14, 1997 | [JP] | Japan | 9-060640 |

[51] Int. Cl.[7] .............................. B41M 5/00; C08L 75/08; D21H 19/16

[52] U.S. Cl. .............................. 428/195; 428/331; 428/334; 428/354

[58] Field of Search .............................. 428/195, 207, 428/304.4, 324, 331, 334, 354

[56] References Cited

U.S. PATENT DOCUMENTS

| | | | |
|---|---|---|---|
| 4,446,174 | 5/1984 | Maekawa et al. . | |
| 4,572,847 | 2/1986 | Haruta et al. | 427/261 |
| 4,911,977 | 3/1990 | Mouri et al. . | |

FOREIGN PATENT DOCUMENTS

| | | |
|---|---|---|
| 56-99692 | 8/1981 | Japan . |
| 56-148582 | 11/1981 | Japan . |
| 57-129779 | 8/1982 | Japan . |
| 59-123696 | 7/1984 | Japan . |

(List continued on next page.)

*Primary Examiner*—Daniel Zirker
*Attorney, Agent, or Firm*—Sixbey Friedman Leedom & Ferguson; Thomas W. Cole

[57] ABSTRACT

The present invention provides a water-base ink absorbing material which can quickly absorb a water-base ink and has an excellent fixativity of the drying water-base ink and on which print with a good definition can be achieved without inducing inconsistencies in color density and bleeding of ink.

The ink absorbing material is prepared so as to satisfy the following requirements ① through ③:

① the contact angle measured at ordinary temperature by the liquid drop method using water is 50 degrees or less;

② the wetting index measured in compliance with "Testing method of wettability of polyethylene and polypropylene films" defined by JIS-K-6768 is 40 dyn/cm or more; and ③ the water vapor permeability P is 800–20000 $g/m^2/24$ h/0.1 mm, wherein P is obtained by converting the water vapor permeability P', measured in compliance with "Testing method for determination of the water vapor permeability of water vaporproof packaging materials (dish method)" defined by JIS-Z-0208 and in its temperature and moisture condition B, into the water vapor permeability at a thickness of 0.1 mm based on the following equation $$P=d\times P'/0.1$$

wherein d is a thickness (mm) of a specimen used for measurement of the water vapor permeability P'.

17 Claims, 3 Drawing Sheets

FOREIGN PATENT DOCUMENTS

| | | |
|---|---|---|
| 60-248387 | 9/1985 | Japan . |
| 63-170075 | 7/1988 | Japan . |
| 63-057277 | 11/1988 | Japan . |
| 3-251487 | 11/1991 | Japan . |
| 5-96844 | 4/1993 | Japan . |
| 7-81210 | 3/1995 | Japan . |
| 7-186522 | 7/1995 | Japan . |
| 8-52934 | 2/1996 | Japan . |
| 8-503903 | 4/1996 | Japan . |
| 8-230315 | 9/1996 | Japan . |
| 9-216458 | 8/1997 | Japan . |

WATER-COLOR INK ABSORBING MATERIAL AND LAMINATED FILM HAVING LAYER OF THE ABSORBING MATERIAL

TECHNICAL FIELD

This invention relates to a water-base ink absorbing material used for printing using a water-base ink and for printing and copying with an ink jet printer using a water-base ink, and relates to a laminated film having a layer of the water-base ink absorbing material.

BACKGROUND ART

Recently, it has been considered to bond a film, on which printing is made by an ink jet printer, to various kinds of base materials and use it for outdoor signboards, indoor signboards, drop curtains, roll screens, blinds, curtains, shutters, wall coverings and the like.

Printing by an ink jet printer is made in a manner of directing a jet of ink through a nozzle at a film. When a solvent type ink is used for this printer, it dries early so that the nozzle is readily clogged up with the dry ink. Therefore, a water-base ink is generally used for the printer. The water-base ink includes pigment, dye or both of them as a colorant and includes a dispersing agent soluble in water. A target color is obtained by plural coats with water-base inks of four colors, i.e., blue, red, yellow and black. The film on which printing is to be made is selected, according to application purposes such as places to be used (for example, outdoor or indoor) and how the film is to be used (i.e., a method of bonding the film to the base material), from among a thermoplastic resin film such as a polyvinyl chloride resin film, a polypropylene resin film, a polyester resin film and an acrylic resin film, paper, cloth, tarpaulin and the like.

Japanese Patent Application Laid-Open Gazette No. 5-229246 discloses a technique in which an ink absorbing material layer is provided on a surface of a plastic base film in order to increase the definition of images by the ink jet printer and the absorbability to the water-base ink and the ink absorbing material layer is formed by coating the base film with a polyester resin dispersion in water. The coating liquid is obtained by modifying polyester resin with a compound having a polymeric double bond such as a vinyl monomer and then copolymerizing it with unsaturated carboxylic amide and the like. Japanese Patent Application Laid-Open Gazette No. 8-11421 discloses a technique of forming an ink absorbing material layer by a coating liquid obtained by mixing polyvinyl pyrrolidone, non-water-soluble acrylic resin, silica and organic minute particles with a solvent.

However, in the case of direct printing on the thermoplastic resin film, cloth, tarpaulin and the like by a water-base ink, such a film for printing is made of resin or fibers and therefore does not absorb the water-base ink but repels it. This makes it difficult to print a target image or pattern with a good definition. In particular, the water-base ink uses, as a solvent, water and a nonvolatile organic solvent (such as ethylene glycol, diethylene glycol and methyl carbitol), and such a solvent has a low drying speed. If multicolor printing is made with the use of such a solvent, at the printing of the second color after the printing of the first color, an ink of the first color is mixed with an ink of the second color so that bleeding readily occurs. This requires a long drying time, resulting in poor workability.

On the other hand, if printing is made on a laminated film obtained by providing the above-mentioned ink absorbing material layer on the base film, this increases printability. However, the laminated film cannot sufficiently obtain the definition of the images and the like, the dryability of the water-base ink and the fixativity of the water-base ink.

DISCLOSURE OF INVENTION

In view of the foregoing, the present invention has an object of providing an ink absorbing material which excels in wettability, absorbability and dryability to a water-base ink and on which clear patterns and images can be printed without inducing inconsistencies in color density and bleeding of ink.

To attain the above object, in the present invention, studies of the water-base ink absorbing material are conducted from the viewpoint of the wetting index (wetting tension), the water vapor permeability and the contact angle, and these properties are optimized.

More specifically, the present invention premises a water-base ink absorbing material provided on a surface of a base in order to fix a water-base ink and is characterized by satisfying all the following requirements ⓪ through ③:

① the contact angle measured at ordinary temperature by the liquid drop method using water is 50 degrees or less;

② the wetting index measured in compliance with "Testing method of wettability of polyethylene and polypropylene films" defined by JIS(Japanese Industrial Standards)-K-6768 is 40 dyn/cm or more; and ③ the water vapor permeability P is 800–20000 $g/m^2/24$ h/0.1 mm, wherein P is obtained by converting the water vapor permeability P', measured in compliance with "Testing method for determination of the water vapor permeability of water vaporproof packaging materials (dish method)" defined by JIS-Z-0208 and in its temperature and moisture condition B, into the water vapor permeability at a thickness of 0.1 mm based on the following equation $$P=d\times P'/0.1$$

wherein d is a thickness (mm) of a specimen used for measurement of the water vapor permeability P'.

Contact angle

The contact angle shown in the requirement ① is a basic physical quantity for determining whether a solid is wettable to a liquid. When the water-base ink absorbing material (hereinafter, referred to as the ink absorbing material) is readily wet to water, the contact angle has a small value. Also when the water absorbability of the ink absorbing material is high, the contact angle has a small value. Therefore, the contact angle not only can serve as an alternative characteristic for determining the suitability of the ink absorbing material in terms of wettability to a water-base ink and further for determining the extent to which the printing density can be obtained, but also can serve as an alternative characteristic for determining the suit ability of the ink absorbing material in terms of absorbability to solvent ingredients of the water-base ink and further for determining the dryability of the ink.

More specifically, from the viewpoint of the relationship between the ink absorbing material and the water-base ink, the fact that the ink absorbing material is readily wet to water means that when the water-base ink is made contact with the ink absorbing material, the ink absorbing material is readily wet to the water-base ink (i.e., the ink absorbing material readily conforms to the water-base ink). On the contrary, when the water-base ink does not conform to the ink absorbing material but is repelled by it, the water-base ink locally coheres on the surface of the ink absorbing material and protrudes thereon. In the case of the ink jet printer, the dot area on the printed surface becomes smaller than expected and the resultant printed surface exhibits as a whole a coarse finish that the dot interval becomes larger (the area of a blank between the dots becomes larger). Therefore, the obtained printing density is low. However, when the water-base ink conforms to the ink absorbing material, i.e., when the ink absorbing material is readily wet to the water-base ink, printing by the ink jet printer is readily performed in the expected dot form, so that the printing density is high. Consequently, the contact angle can serve as an alternative characteristic of the printing density.

On the other hand, from the viewpoint of the relationship between the ink absorbing material and the water-base ink, the fact that the ink absorbing material has a good water absorbability means that when the water-base ink is made contact with the ink absorbing material, the ink absorbing material sufficiently absorbs water and a nonvolatile organic solvent (such as ethylene glycol, diethylene glycol and methyl carbitol), which are both solvent ingredients in the water-base ink, so that the water-base ink readily dries. Consequently, the contact angle can serve as an alternative characteristic for determining the dryability of the ink.

If the ink absorbing material has a poor ink dryability, when only a short time has passed after printing, undry ink flows on the printed surface or adheres to fingers, or the ink is readily transferred on another thing put on the printed surface. This makes the workability poor and makes it difficult to obtain a good printing finish. In the case of multicolor printing, the first-colored ink is mixed with the second-colored ink so that bleeding readily occurs. This degrades the printing finish.

To cope with the foregoing, in the present invention, the contact angle is set at 50 degrees or less from the viewpoint of the printing density and the ink dryability. In detail, when the contact angle is over 50 degrees, it is basically difficult that the ink absorbing material obtains a good wettability to the water-base ink and thereby increases printing density. Further, in this case, the ink absorbing material decreases absorbability and therefore decreases ink dryability. In view of this, the contact angle is preferably 40 degrees or less, and more preferably within the range of 10 to 30 degrees.

However, the contact angle depends on both wettability and absorbability to water as described above. Therefore, even when the contact angle is 50 degrees or less, the ink absorbing material can exhibit a poor absorbability while exhibiting a good wettability. On the contrary, the ink absorbing material ca n exhibit a poor wettability while exhibiting a good absorbability. Accordingly, in order to make the ink absorbing material suitable for printing with the water-base ink, a simple requirement that the contact angle is small is not sufficient.

Therefore, in the present invention, in addition to the above-mentioned requirement ① in terms of the contact angle, the above-mentioned requirement ② in terms of the wetting index and the above-mentioned requirement ③ in terms of the water vapor permeability are set.

Wetting index

The wetting index of the requirement ② is the surface tension of a mixture liquid that, when a series of mixture liquids sequentially different in surface tensions are in turn applied on the surface of the ink absorbing material, it is determined that the surface of the ink absorbing material is appropriately wet. Strictly speaking, when the surface tension of a mixture liquid is equal to the wetting index (wetting tension) of the ink absorbing material, the mixture liquid appropriately wets the ink absorbing material.

Accordingly,, based on the wetting index, there can be determined the extent to which the water-base ink conforms to (wets) the ink absorbing material when the water-base ink is made contact with the ink absorbing material. The wetting index can serve as an alternative characteristic for determining the suitability of the ink absorbing material in terms of the wettability to the water-base ink and further for determining the extent to which the printing density can be obtained.

More specifically, the surface tension of the water-base ink is generally 40 dyn/cm or more. Therefore, when the wetting index of the ink absorbing material is low, i.e., less than 40 dyn/cm, the water-base ink does not conform to the ink absorbing material but is repelled by it. As a result, the water-base ink coheres on the surface of the ink absorbing material and protrudes thereon. In the case of using the ink jet printer, the dot area on the printed surface becomes smaller than expected so that the obtained print exhibits, as a whole, a coarse finish that the dot interval becomes larger (i.e., the area of a blank between the dots becomes larger). As a result, the obtained printing density is low.

On the contrary, when the wetting index of the ink absorbing material is 40 dyn/cm or more, the water-base ink relatively well conforms to the ink absorbing material and wets it. In the case of using the ink jet printer, printing is readily performed in the expected dot form, thereby increasing the printing density. In view of this, a preferable wetting index is 45 dyn/cm or more and a more preferable wetting index is 54 dyn/cm or more. Though the upper limit of the wetting indexes of the standard liquids for measuring the wetting index defined in JIS is 56 dyn/cm, the present invention can set a wetting tension substantially exceeding the uppermost wetting index described in JIS. For example, the wetting tension of the present invention can be set such that the contact angle is 0 degree in the case of using water. Note that the wetting tension of the present invention has no strict correspondence with the wetting index of JIS because of a difference in used liquids. However, since the surface tension of water is 72.75 dyn/cm at ordinary temperature, the wetting tension in this case is 72.75 dyn/cm.

Water vapor permeability

The water vapor permeability of the requirement ③ means an amount of vapor permeating a film material per unit area (1 $m^2$) for a specified time (24 hours). Accordingly, based on the water vapor permeability, there can be determined, when the water-base ink is made contact with the ink absorbing material, the extent to which the ink absorbing material can absorb water and a nonvolatile organic solvent as solvent ingredients of the water-base ink and further the extent to which the ink absorbing material can dry. In other words, the water vapor permeability can serve as an alternative characteristic for determining the suitability of the ink absorbing material in terms of the absorption of the solvent ingredients of the water-base ink and further for determining the ink dryability.

Since the water vapor permeability is largely influenced by the temperature and the moisture in an atmosphere under test, the present invention adopts the temperature and moisture condition B defined by JIS-Z-0208 (temperature: 40±0.5° C., relative humidity: 90±2%). Further, since the value of the water vapor permeability is dependent on the thickness of the specimen, the water vapor permeability measured according to the requirements of JIS-Z-0208 is converted to the water vapor permeability at a thickness of 0.1 mm.

Influences which the water vapor permeability has on printing by the water-base ink will be described in detail. When the water vapor permeability is below 800 $g/m^2/24$ h/0. 1 mm, the ink absorbing material has a low ability to absorb the solvent ingredients of the water-base ink so that the ink dries slowly. Therefore, when only a short time has passed after printing, undry ink flows on the printed surface, adheres to fingers, or is readily transferred on another thing put on the printed surface. This induces a poor workability and makes it difficult to obtain a good printing finish. Further, in the case of multicolor printing, the first-colored ink is mixed with the second-colored ink so that bleeding readily occurs. This provides a poor printing finish.

In view of this, the water vapor permeability is preferably 1500 $g/m^2/24$ h/0.1 mm or more and more preferably, 4800 $g/m^2/24$ h/0.1 mm or more. The upper limit of the water vapor permeability is preferably about 20000 $g/m^2/24$ h/0. 1 mm and more preferably about 10000 $g/m^2/24$ h/0.1 mm.

Water-base ink

As described above, the water-base ink suitably used for the ink absorbing material of the present invention is an ink which uses pigment, dye or both of them as a colorant and whose dispersing agent is soluble in water. However, various types of water-base inks can be used. For example, one suitable water-base ink of the present invention is a water-base ink composition which is made of pigment, a dispersing agent and a solvent, whose dispersing agent is a polymer having as a main ingredient alkylester acrylate or alkylester methacrylate which includes as a lipophilic part an alkyl group having an aromatic ring or carbons over a specified number and includes as a hydrophilic part a carboxylic group or a sulfonic group, and whose solvent is a mixture of water and a nonvolatile hydrophilic organic solvent.

Thickness of Ink absorbing material

The thickness of the above-mentioned ink absorbing material, i.e., the thickness of the ink absorbing material layer provided on a surface of the base material, is preferably 5 μm or more in order to absorb the water-base ink into the ink absorbing material with reliability thereby drying and fixing it. More preferably, the thickness of the ink absorbing material layer is 10 μm or more. Though the upper limit of the thickness is not particularly limited, in the case where the ink absorbing material layer is formed by coating the base with the ink absorbing material, it is advantageous in terms of the coating workability that the upper limit of the thickness is about 50 μm. However, even if the thickness is 100 μm or 200 μm, no problem occurs in terms of the fixing of the water-base ink. Note that it is not particularly necessary that the ink absorbing material layer has a thickness exceeding 200 μm.

Formation of Ink absorbing material layer on Base

As a method of forming the water-base ink absorbing material layer on the surface of the base, besides the above-mentioned coating, there can be also applied a method of forming the ink absorbing material layer in a manner to first form a film of the ink absorbing material, adhere a release paper to one surface of the film through a pressure sensitive adhesive layer, remove the release paper from the film and then adhere the film to the base. Accordingly, the base in this case does not necessarily have a film-like form.

In the case of forming the ink absorbing material layer on the surface of the film-like base to obtain a laminated film, as material for the film for the base layer, a thermoplastic resin film such as a vinyl chloride resin film, a polyolefin resin film, a polyester resin film and an acrylic resin film, polyester cloth, cotton cloth, tarpaulin or the like can be adopted. On the back surface of such a laminated film (one surface of the base layer opposite to the ink absorbing material layer), a pressure sensitive adhesive layer can be formed.

As a pressure sensitive adhesive in the case where the pressure sensitive adhesive layer is formed on the ink absorbing material or the base, an acrylic resin pressure sensitive adhesive is adopted. However, in a condition of having a sufficient adhesive property with the material on which the adhesive is to be applied, various kinds of other adhesives can be also adopted.

In the case of forming the ink absorbing layer on the base surface by the above-mentioned coating, when there is a possibility that an insufficient adhesive property is exhibited between the base and the ink absorbing material, a primer as a medium for adhesion between them can be first applied and the ink absorbing material can be then applied on the primer. Further, the ink absorbing material layer or the laminated film can be subjected to moisture or pressure to give a gloss thereto in a later step.

As mentioned so far, in relation to the water-base ink absorbing material provided on the base surface, the contact angle of the requirement ① is 50 degrees or less, the wetting index of the requirement ② is 40 dyn/cm or more and the water vapor permeability of the requirement ③ is 800 to 20000 $g/m^2/24$ h/0.1 mm. Accordingly, the ink absorbing material can have a good wettability to the water-base ink thereby achieving a high ink density (printing density), have a good dryability to the water-base ink thereby increasing the printing workability, and increase the fixativity of the water-base ink.

Further, if the thickness of the ink absorbing material is 5 μm or more, the ink absorbing material can advantageously obtain the above-mentioned effects.

Another aspect of the present invention has been made by focusing attention on the point that if the water-base ink absorbing material is prepared so as to include as a main ingredient urethane resin having a water absorbing function, expected effects can be obtained.

More specifically, this aspect of the present invention premises a water-base ink absorbing material provided on a surface of a base to fix a water-base ink thereon and is characterized in that the water-base ink absorbing material is prepared in a manner that a water absorbing agent is mixed with polyurethane resin (hereinafter, referred to as water-absorbable urethane resin) synthesized by using polyether polyol including polyethylene oxide.

The presence of polyethylene oxide causes the water-base ink absorbing material to absorb water content in the water-base ink through the contact with the ink and concurrently swell. A significant characteristic of this aspect of the present invention is in that the ink absorbing material not only has a water absorbing function but also exhibits swelling.

This point will be described more specifically. Supposed that the water-base ink absorbing material has only a function of permeating water content of the water-base ink. In this case, when the ink absorbing material is made contact with the water-base ink, pigment or dye in the ink permeates, together with the water content, the ink absorbing material along the surface thereof to spread horizontally and concurrently permeates the ink absorbing material vertically from the surface to the inside. If such a function is too strong, the ink density becomes low due to vertical and horizontal bleeding of pigment or the like, resulting in print lacking in definition.

On the other hand, if the function of absorbing water content is weak, the above problem of bleeding is eliminated. However, since the ink absorbing material has an insufficient absorbability to water of the water-base ink, its drying time becomes long. Therefore, when only a short time has passed after printing, undry ink flows on the printed surface, adheres to fingers, or is readily transferred on another thing put on the printed surface. This makes the workability poor and makes it difficult to obtain a food printing finish. Further, in multicolor printing, the first-colored ink is mixed with the second-colored ink so that bleeding readily occurs. This induces a poor printing finish.

Unlike the above case, in the present invention, polyethylene oxide gives the ink absorbing material a function of absorbing water content of the water-base ink and further swelling. Therefore, when the water-base ink is made contact with the ink absorbing material, though the water-base ink gives water content to the ink absorbing material to relatively quickly dry, the ink absorbing material swells to hold water content at a part in contact with the ink. Accordingly, it can be prevented that the water content widely spreads from the contact part to the surroundings. This decreases bleeding by pigment or the like thereby preventing a drop in ink density.

As polyurethane resin having the function of absorbing water, resin whose area swelling rate is 10% to 200% is preferable. The area swelling rate is measured in the following manner.

After a film having a dimension of 10 cm by 10 cm and a thickness of approximately 100 $\mu$m is immersed in water for one hour, the dimension is measured and the area swelling rate is calculated according to the following formula.

$$\text{Area swelling rate (\%)}=((\text{area after one hour})-100)/100\times100$$

When the area swelling rate is less than 10%, the printing characteristic of the water-base ink is not sufficient. On the other hand, when the area swelling rate is more than 200%, the water resistance becomes poor.

As the above-mentioned polyurethane resin, resin synthesized by using polyether polyol including polyethylene oxide is preferable. Concrete examples of such resin are SANPREN HMP-17A (area swelling rate: 40%) produced by Sanyo Chemical Industries, Ltd. and LACSKIN U-2506-1 (area swelling rate: 20%) produced by Seiko Kasei Kabushiki Kaisha. To the water-base ink absorbing material, a surface tension reducing agent such as a wetting agent can be added as necessary, in addition to the water-absorbable resin and the water absorbing agent.

Further, the water absorbing agent in the ink absorbing material aids or accelerates water absorption of polyethylene oxide to increase ink dryability and ink fixativity. The water absorbing agent can be either an inorganic substance or an organic substance such as protein, and is preferably silica, collagen, cross-linking acrylate (polyacrylate) and calcium carbonate as mentioned below. By using these substances singly or in combination, expected effects can be obtained. Such water absorbing agents will be described next in detail.

Silica

The type of silica (silicon dioxide) to be used in the present invention is not limited. However, in order to increase the water absorbability of the ink absorbing material, silica having a large specific surface area and a large pore capacity is suitable. In such silica, one particle is formed such that sphere primary particles having a size of approximately 20 to 30 nm in the form of hydrate and amorphism undergo secondary or tertiary cohesion.

In the case of using the ink absorbing material obtained by adding silica to the water-absorbable urethane resin, when printing is made with the use of the water-base ink, the ink absorbing material can be increased in the function of absorbing water content of the water-base ink thanks to the structural characteristic of silica having a large specific surface area and a large pore capacity in addition to the water absorbing and swelling function of the water-absorbable urethane resin. This advantageously increases ink dryability. Further, since the colorant (pigment or dye) in the water-base ink is captured in pores of silica, it is prevented that the colorant permeates the surroundings more than required. This provides a good-definition print.

The compounding ratio of silica is preferably 30 to 500 weight parts with respect to 100 weight parts of above-mentioned water-absorbable urethane resin at an amount of solid resin excluding solvent (hereinafter, the compounding ratio of water-absorbable urethane resin is used in the same meaning unless otherwise specified). The reason for this is that less than 30 weight parts of silica is not sufficient to obtain the above-mentioned effects while more than 500 weight parts of silica causes damage to the adhesive property of the ink absorbing material to the base. The size of silica is preferably about 1 $\mu$m to 15 $\mu$m in mean particle size and more preferably about 1 $\mu$m to 10 $\mu$m in mean particle size.

Collagen

Collagen is protein present in connective tissues such as skin and tendon and in hard organizations such as bone and dentin and has a function of absorbing moisture and water.

In the case of using the ink absorbing material obtained by adding collagen to the above-mentioned water-absorbable urethane resin, when printing is made with the water-base ink, the ink absorbing material can be increased in the function of absorbing water content of the water-base ink thanks to the water absorbing function of collagen in addition to the water absorbing and swelling function of the water-absorbable urethane resin. This increases ink dryability. Further, since the addition of collagen produces microscopic asperities on the surface of the ink absorbing material, the microscopic asperities capture the colorant of the water-base ink so that the colorant can be prevented from permeating the surroundings more than required, which provides a good-definition print. Furthermore, collagen prevents stickness of the printed surface.

The compounding ratio of collagen is preferably 30 to 500 weight parts with respect to 100 weight parts of the above-mentioned urethane resin. The reason for this is that less than 30 weight parts of collagen is not sufficient to obtain the above-mentioned effects while more than 500 weight parts of collagen readily causes poor dispersion in the ink absorbing material, which degrades the surface state of the ink absorbing material layer when the base is coated with the ink absorbing material. The size of collagen is preferably about 6 $\mu$m to 15 $\mu$m in mean particle size and more preferably about 6 $\mu$m to 10 $\mu$m in mean particle size.

Cross-linking acrylate

Cross-linking acrylate has a three-dimensional structure that long chains of polymers are bonded at some sites and has a water absorbing function. Accordingly, when cross-linking acrylate includes no water, it shrinks to densely solidify as a whole. On the other hand, when cross-linking acrylate is put in water, it begins to spread so as to be solved in water because the chain has many hydrophilic groups (carboxylic groups). Since the electric charge of the hydrophilic group is biased on the minus side, hydrophilic groups repel one another so that the spread of cross-linking acrylate is further accelerated. However, since this salt has a three-dimensional network structure, it spreads in water to a certain extent and then stops spreading to turn into a swelling state that water is enclosed in the network structure.

In the case of using the ink absorbing material obtained by adding such cross-linking acrylate to the above-mentioned water-absorbable urethane resin, when printing is made with the use of the water-base ink, the ink absorbing material can be increased in the function of absorbing water content of the water-base ink thanks to the water absorbing and swelling function of cross-linking acrylate in addition to the water absorbing and swelling function of the above-mentioned water-absorbable urethane resin. This increases ink dryability. Further, since the addition of cross-linking acrylate produces microscopic asperities on the surface of the ink absorbing material, the microscopic asperities capture the colorant of the water-base ink so that the colorant can be prevented from permeating the surroundings more than required, which provides a good-definition print.

The compounding ratio of cross-linking acrylate is preferably 30 to 300 weight parts with respect to 100 weight parts of the above-mentioned urethane resin. The reason for this is that less than 30 weight parts of cross-linking acrylate is not sufficient to obtain the above-mentioned effects while more than 300 weight parts of cross-linking acrylate readily causes poor dispersion in the ink absorbing material, which degrades the surface state of the ink absorbing material layer when the base is coated with the ink absorbing material. The reason why the upper limit of the compounding ratio of cross-linking acrylate is lower than those of silica, collagen and calcium carbonate mentioned later is that the particle size of cross-linking acrylate is larger than those of the other types of water absorbing agents and therefore cross-linking acrylate more readily produces asperities on the coating surface. Cross-linking acrylate generally has a particle size of about 10 $\mu$m to 50 $\mu$m.

Calcium carbonate

Calcium carbonate is generally obtained in a manner that $CaCO_3$ solving in hydrosphere precipitates through living things or due to chemical factors and then piles, and has a certain solubility in water. Because of this property, when calcium carbonate is added to the above-mentioned water-absorbable urethane resin so that the ink absorbing material is obtained, calcium carbonate in the ink absorbing material serves as an ingredient for absorbing water content of the water-base ink to accelerate the drying of the water-base ink.

Further, calcium carbonate generally has a good compatibility with a resin solution. When the base is coated with a mixture liquid of calcium carbonate and a resin solution by using a bar coater, gravure coater or the like, calcium carbonate causes no damage to the surface smoothness of the coating film (ink absorbing material layer). Furthermore, since calcium carbonate has a small mean particle size of 0.1 $\mu$m to 3 $\mu$m, it is easy to uniformly disperse and therefore the obtained ink absorbing material causes no substantial irregular absorption of the water-base ink. This provides an advantage in printing with a proper ink density.

In order to increase the compatibility of calcium carbonate and the resin, surfaces of calcium carbonate particles can be coated with fatty acid or cation. However, since the present invention uses calcium carbonate as a water absorbing agent, it is preferable to avoid such a coating treatment.

The compounding ratio of calcium carbonate is preferably to 500 weight parts with respect to 100 weight parts of the above-mentioned urethane resin. The reason for this is that less than 30 weight parts of calcium carbonate is not sufficient to obtain the above-mentioned effects while more than 500 weight parts of calcium carbonate readily causes poor dispersion in the ink absorbing material, which degrades the coating surface state.

Water-base ink

The water-base ink applied to the ink absorbing material, the thickness of the ink absorbing material and the formation of the ink absorbing material layer are the same as in the first-mentioned aspect of the present invention.

Accordingly, in the present aspect of the invention, since the water-base ink absorbing material provided on the surface of the base is prepared in a manner that the water absorbing agent is mixed with polyurethane resin synthesized using polyether polyol including polyethylene oxide, the water-base ink absorbing material exhibits a good wettability to the water-base ink thereby achieving a high ink density (printing density), exhibits a good dryability to the water-base ink thereby increasing printing workability, and increases the fixativity of the water-base ink.

Further, if the ink absorbing material uses, as the water absorbing agent, silica, collagen, cross-linking acrylate or calcium carbonate singly or in combination of two or more selected from among the above substances, this provides an advantage in increasing dryability to the water-base ink. In addition, the colorant in the water-base ink can be well captured, which provides an advantage in obtaining a printing finish with a high definition.

Furthermore, if the thickness of the ink absorbing material is 5 $\mu$m or more, this provides an advantage in that the ink absorbing material obtains the aforementioned effects.

Still another aspect of the present invention premises a water-base ink absorbing material provided on a surface of a base to fix a water-base ink and is characterized in that the water-base ink absorbing material is prepared in a manner that water-absorbable resin is mixed with at least one water absorbing agent selected from among porous calcium carbonate, whisker-formed calcium carbonate, water-swellable mica, talc and zeolite.

More specifically, in the present aspect of the invention, the mixture of the water absorbing agent into the water-absorbable resin gives the water-absorbable resin a function of absorbing water content of the water-base ink and further swelling. Accordingly, the water-base ink gives its water content to the ink absorbing material on contact with it to relatively quickly dry, whereas the ink absorbing material swells to hold water content at its contact part with the ink. Thereby, it can be prevented that the water content widely spreads from the contact part to the surroundings. This reduces bleeding of pigment or the like and therefore prevents a drop in ink density.

As the water absorbing agent, porous calcium carbonate, whisker-formed calcium carbonate, water-swellable mica, talc or zeolite is preferable and can be selectively used singly or in combination of two or more. The water absorbing agent will be described next in detail.

Porous calcium carbonate

Unlike normal calcium carbonate, porous calcium carbonate is obtained by collecting calcium carbonate corpuscles into greater-sized porous particles and has a high porous capacity, a high oil absorption and a high water absorption. An example of porous calcium carbonate is CALLITE-KT produced by Kabushiki Kaisha Shiraishi Chuo Kenkyusho. Preferable porous calcium carbonate has an apparent specific gravity of 0.1 to 0.5 g/ml (by tap method), an oil absorption of 50 to 300 ml/100 g (by Ogura method) and a specific surface area of 10 to 100 $m^2$/g (by BET method).

Whisker-formed calcium carbonate

Whisker-formed calcium carbonate is calcium carbonate having the form of fibers. Whisker-formed calcium carbonate is produced by introducing $CO_2$ into a $Ca(OH)_2$ slurry as in the production of industrial calcium carbonate and growing crystal in a fixed direction through the control of reaction conditions during liquid-vapor chemical reaction of carbonation. An example of whisker-formed calcium carbonate is WHISCAL produced by Maruo Calcium Co., Ltd. Preferable whisker-formed calcium carbonate has a mean fiber length of 1.0 to 40 μm and a mean fiber diameter of 0.5 to 3.0 μm.

Water-swellable mica

Water-swellable mica is a high-purity fluoric mica synthesized by using talc as a main ingredient and has a property of swelling in water to form a dispersion liquid of viscous microcrystals. Examples of water-swellable mica are SOMASHIF ME-100 series produced by CO-OP CHEMICAL CO., LTD. Preferable water-swellable mica has a bulk density of 0.2 to 0.8 g/cm$^3$ and a specific surface area of 2 to 30 m$^2$/g.

Talc

The type of talc (magnesium silicate) to be used is not limited. However, talc to be used preferably has a small mean particle size of 0.5 μm to 5 μm and a whiteness degree of 85% or more. An example of talc is LMG-100 produced by Fuji Talc Kogyo Kabushiki Kaisha. Preferable talc has a mean particle size of 1.6 μm to 2.0 μm and a whiteness degree of 85%.

Zeolite

Suitable zeolite is synthetic zeolite obtained by chemically reacting sodium silicate, aluminium hydroxide and sodium hydroxide as materials to synthesize them. It is preferable that such zeolite has the form of minute powders. An example of zeolite is powder-formed TOYOBUILDER produced by TOSOH CORPORATION. Preferable zeolite has a mean particle size of 0.5 μm to 5 μm and a bulk density of 0.1 to 0.7 g/cm$^3$.

Compounding ratio of Water absorbing agent

The compounding ratio of the water absorbing agent is preferably 50 to 500 weight parts with respect to 100 weight parts of the water-absorbable resin (at an amount of solid resin excluding a solvent). The reason for this is that less than 50 weight parts of the water absorbing agent is not sufficient to obtain the above-mentioned effects while more than 500 weight parts of the water absorbing agent causes damage to the adhesive property of the ink absorbing material to the base.

The above-mentioned preferable range of the compounding ratio of the water absorbing agent can be applied in both the case where the water absorbing agents listed above are singly used and the case where the water absorbing agents are used in combination.

Water-absorbable resin

It is preferable that the water-absorbable resin has not only the water absorbing function but also the swelling function. The water-absorbable resin is preferably resin exhibiting an area swelling rate of 10% to 200% as the water absorbing and swelling function. The reason for this is that resin whose area swelling rate is less than 10% is not sufficient for printing characteristic by the water-base ink while resin whose area swelling rate is more than 200% has a problem on water resistance.

As the water-absorbable resin, polyurethane resin synthesized by using polyether polyol including polyethylene oxide is preferable. Concrete examples of such polyurethane resin are SANPREN HMP-17A (area swelling rate: 40%) produced by Sanyo Chemical Industries, Ltd. and LACKSKIN U-2506-1 (area swelling rate: 20%) produced by Seiko Kasei Kabushiki Kaisha. To the water-base ink absorbing material, a surface tension reducing agent such as a wetting agent can be added as necessary, in addition to the water-absorbable resin and the water absorbing agent.

Water-base ink

The water-base ink to be applied to the ink absorbing material, the thickness of the ink absorbing material and the formation of the ink absorbing material layer on the base are the same as in the first-mentioned aspect of the present invention.

Accordingly, in the present aspect of the invention, since the water-base ink absorbing material provided on the surface of the base is prepared in a manner that the water-absorbable resin is mixed with at least one water absorbing agent selected from among porous calcium carbonate, whisker-formed calcium carbonate, water-swellable mica, talc and zeolite, the water-base ink absorbing material exhibits a good wettability to the water-base ink thereby achieving a high ink density (printing density), exhibits a good dryability to the water-base ink thereby increasing printing workability, and increases the fixativity of the water-base ink.

Further, if the ink absorbing material uses, as the water-absorbable resin, polyurethane resin synthesized using polyether polyol including polyethylene oxide, the water absorbing and swelling function of the polyurethane resin further increases printability.

BEST MODE FOR CARRYING OUT THE INVENTION

Figure 1:
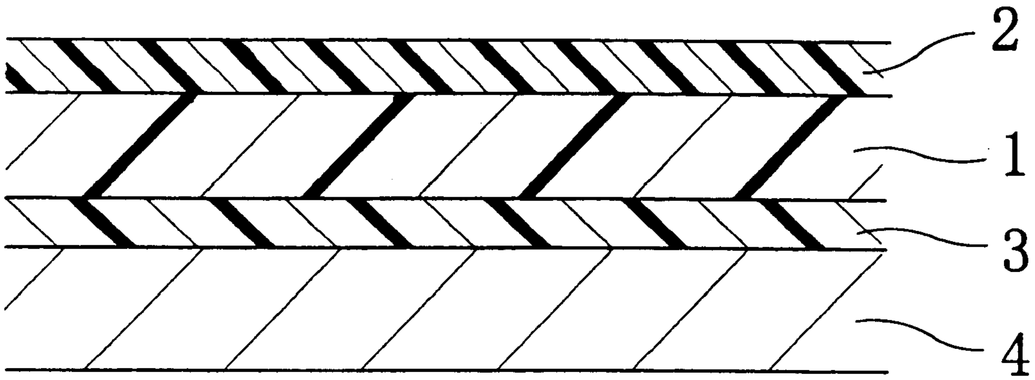
FIG. 1 is a cross section showing an embodiment of a laminated film of the present invention.

FIG. 1 shows an embodiment of a laminated film for water-base ink of the present invention. In the film, a reference numeral 1 denotes a base layer, a reference numeral 2 denotes an ink absorbing material layer formed on the surface of the base layer 1, a reference numeral 3 denotes a pressure sensitive adhesive layer formed on the back surface of the base layer 1, and a reference numeral 4 denotes a release paper.

Figure 2:
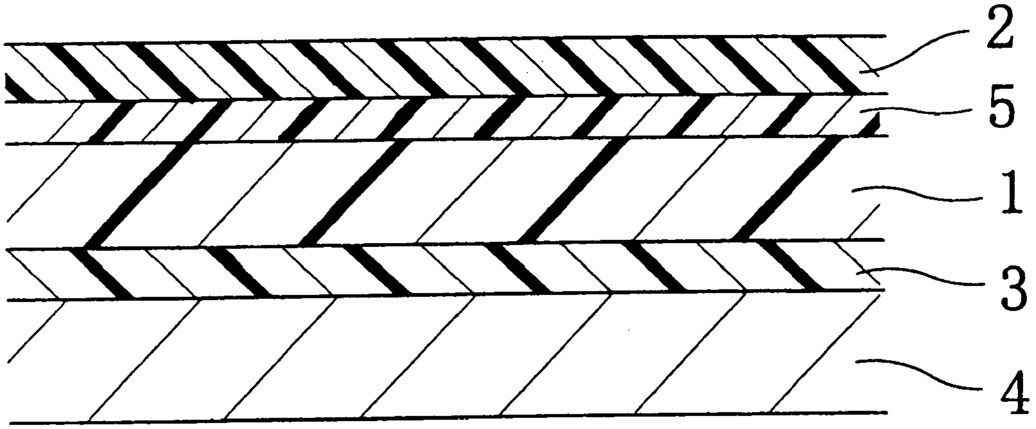
FIG. 2 is a cross section showing another embodiment of the laminated film of the present invention.

FIG. 2 shows another embodiment of the laminated film of the present invention. In this embodiment, a primer layer 5 is provided between the base layer 1 and the ink absorbing material layer 2. The primer layer 5 is a layer for supporting the bonding between the base layer 1 and the ink absorbing material layer 2. For example, when the base layer 1 is formed of a polyester film, a primer matching to the material of the base layer 1, e.g., a polyester primer, is used.

Concrete examples of the present invention and comparative examples will be described below.

EXAMPLE 1

100 weight parts of vinyl chloride resin (degree of polymerization: 1050) is mixed with 28 weight parts of plasticizer, a suitable amount of titanium pigment, a suitable amount of Ba—Zn stabilizer and a suitable amount of acrylic process aid. This mixed material is sheeted at a thickness of 50 μm by calendering thereby obtaining a film for base layer.

Next, in order to form the pressure sensitive adhesive layer 3 on the back surface of the film for base layer, the release paper 4 having a thickness of 170 μm is coated with an acrylic resin pressure sensitive adhesive (in which the main ingredient is a mixture of 2-ethylhexyl acrylate, butyl acrylate and acrylic acid (SK DINE 1311 produced by SOKEN CHEMICAL & ENGINEERING CO., LTD.), a stiffener is toluene diisocyanate (TDI) and the main ingredient and the stiffener are mixed with a ratio of 100:3), and is dried thereby forming the pressure sensitive adhesive layer 3 having a thickness of 30 μm. Then, the release paper 4 having the pressure sensitive adhesive layer 3 and the base layer 1 are laminated by a pressure roller.

Subsequently, in order to form the ink absorbing material layer 2, 36 weight parts of silica (CARPLEX BS-304F produced by Shionogi & Co., Ltd.) and 100 weight parts of N,N-dimethyl formamide (DMF) as a solvent are added to 100 weight parts of water-absorbable urethane resin (high-water-absorbable polymer SANPREN HMP-17A, produced by Sanyo Chemical Industries, Ltd., which is urethane resin synthesized using polyether polyol including polyethylene oxide and has a resin solids content of 30%), and these substances are stirred for thirty minutes thereby preparing a liquid for ink absorbing material. The film for base layer, on the back surface of which the release paper 4 is laminated, is coated at another surface thereof with the liquid for ink absorbing material by a bar coater, and the coating surface of the film is dried thereby forming the ink absorbing material layer 2 having a thickness of 30 μm.

EXAMPLES 2 TO 30, COMPARATIVE EXAMPLES 1 TO 9

By changing the type of urethane resin, the type of the water absorbing agent and the compounding ratio of the ink absorbing material, laminated films of Examples 2 to 30 and laminated films of Comparative Examples 1 to 9 are formed in the same manner as in Example 1. Then, laminated films of Examples 1 to 30 and laminated films of Comparative Examples 1 to 9 are subjected to physical property tests and performance evaluations mentioned later. Test results and evaluations of the above examples are shown in Tables 1 to 4 together with respective compounding ratios thereof.

The column of compounding in each of Table 1 to 4 shows a composition (solids content) of the ink absorbing material layer of the laminated film in a state that a solvent is removed by drying. For example, in Example 1, 36 weight parts of silica is added to 100 weight parts of water-absorbable urethane resin having a resin solids content of 30%. Accordingly, a resin solids content (an amount excluding a solvent) included in 100 weight parts of the water-absorbable urethane resin is 30 weight parts. When the resin solids content is set at 100 weight parts, a silica content is 120 weight parts (=36 weight parts/0.3). As a result, in Example 1 of Table 1, a water-absorbable urethane resin content is 100 weight parts and a silica content is 120 weight parts. The compounding ratios of another Examples and Comparative Examples are obtained in the same manner. In the column of thickness of each of Table 1 to 4, the thickness of the ink absorbing material layer is shown.

In Comparative Example 1, water-absorbable urethane resin is not used for the ink absorbing material. Instead, 2.0 weight parts of hexamethylene diisocyanate (HDMI) (LACKSKIN U-4000 produced by Seiko Kasei Kabushiki Kaisha) is added to 100 weight parts of ester polyol (LACKSKIN U-46, produced by Seiko Kasei Kabushiki Kaisha, which uses toluene as a solvent and has a resin solids content of 20%), and these substances are stirred for thirty minutes thereby obtaining a liquid for ink absorbing material. With the use of the obtained liquid for ink absorbing material, a laminated film is then formed in the same manner as in Example 1.

In Comparative Example 8, 2.0 weight parts of methylenebis(4-phenyltsocyanate) (MDI), 2 weight parts of silica which is the same as in Example 1 and 2 weight parts of polyether modified silicon oil (KF-618 produced by Shin-Etsu Chemical Co., Ltd.) are added to 100 weight parts of ester polyol. These substances are stirred for thirty minutes thereby obtaining a liquid for ink absorbing material. With the use of the obtained liquid for ink absorbing material, a laminated film is then formed in the same manner as in Example 1.

As collagen, TRIAZET CX285-1 produced by Showa Denko K.K. is used. As acrylate, SANFLESH ST-100SP produced by Sanyo Kasei Co., Ltd. is used. As calcium carbonate, Brilliant-1500 produced by Shiraishi Calcium Kaisha, Ltd. is used.

As a solvent, DMF is used as in Example 1. The amount of use of DMF is different depending upon the amount of addition of the water absorbing agent. Specifically, a solvent content is 100 weight parts in Examples 2, 3, 4, 6 and 11, 150 weight parts in Examples 5, 9, 10, 12, 16, 19 and 20, 200 weight parts in Examples 7, 8, 13, 14, 15, 17, 18 and 23, 300 weight parts in Examples 21, 22 and 24 to 30, and 50 weight parts in Comparative Examples 2 to 7.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| COMPOUNDING | water-absorbable urethane resin (parts) | 100 | 100 | 100 | 100 | 100 | 100 | 100 | 100 | 100 | 100 |
| | silica (parts) | 120 | | | 50 | | | | 100 | 100 | 120 |
| | collagen (parts) | | 100 | | | 200 | | | 200 | | |
| | cross-linking acrylate (parts) | | | 80 | | | 100 | | | 100 | |
| | calcium carbonate | | | | | | | 300 | | | 150 |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| | (parts) | | | | | | | | | | |
| INK ABSORBING LYR. | thickness (μm) | 30 | 30 | 20 | 30 | 20 | 20 | 30 | 15 | 30 | 20 |
| | wetting index (dyn/cm) | 54 or more | 52 | 54 or more | 45 | 54 or more | 54 or more | 52 | 54 or more | 54 or more | 54 or more |
| | water vapor permeability ($g/m^2$) | 7000 | 2600 | 3000 | 1500 | 5000 | 3500 | 1500 | 8500 | 6200 | 7500 |
| | contact angle | 16° | 36° | 20° | 40° | 25° | 18° | 45° | 20° | 23° | 10° |
| EVALUATION | surface state of coating surface | good | good | good | good | good | good | good | good | good | good |
| | adhesive property to base | good | good | good | good | good | good | good | good | good | good |
| | ink conformability (bleeding and repelling) | very good | good | good | good | very good | good | good | very good | very good | very good |
| | ink dryability | dry | dry | dry | dry | dry | dry | dry | dry | dry | dry |
| | ink density | very high | high | high | high | very high | high | high | very high | high | very high |
| | peeling | no | no | no | no | no | no | no | no | no | no |
| TOTAL EVALUATION | | ◎ | ○ | ○ | ○ | ◎ | ○ | ○ | ◎ | ○ | ◎ |

TABLE 2

| | | Example | | | | | | | | | |
|---|---|---|---|---|---|---|---|---|---|---|---|
| | | 11 | 12 | 13 | 14 | 15 | 16 | 17 | 18 | 19 | 20 |
| COMPOUNDING | water-absorbable urethane resin (parts) | 100 | 100 | 100 | 100 | 100 | 100 | 100 | 100 | 100 | 100 |
| | silica (parts) | | | | | 100 | 80 | | 100 | 50 | 100 |
| | collagen (parts) | 100 | 100 | 300 | | 200 | 100 | 100 | | 150 | 50 |
| | cross-linking acrylate (parts) | 30 | | 100 | 100 | 50 | | 50 | 50 | | 50 |
| | calcium carbonate (parts) | | 100 | | 300 | | 100 | 200 | 200 | 100 | 50 |
| INK ABSORBING LYR. | thickness (μm) | 30 | 30 | 20 | 40 | 20 | 30 | 10 | 15 | 40 | 20 |
| | wetting index (dyn/cm) | 51 | 54 or more | 54 or more | 54 or more | 54 or more | 54 or more | 54 or more | 54 or more | 54 or more | 54 or more |
| | water vapor permeability ($g/m^2$) | 1600 | 4200 | 8700 | 6500 | 8400 | 6300 | 1700 | 8200 | 4800 | 6800 |
| | contact angle | 47° | 30° | 25° | 17° | 18° | 20° | 41° | 30° | 21° | 15° |
| EVAL- | surface | good | good | good | good | good | good | good | good | good | good |

TABLE 2-continued

| | | Example | | | | | | | | | |
|---|---|---|---|---|---|---|---|---|---|---|---|
| | | 11 | 12 | 13 | 14 | 15 | 16 | 17 | 18 | 19 | 20 |
| UA-TION | state of coating surface | | | | | | | | | | |
| | adhesive property to base | good | good | good | good | good | good | good | good | good | good |
| | ink conform-ability (bleeding and repelling) | good | good | good | good | very good | very good | good | very good | very good | good |
| | ink dryability | dry | dry | dry | dry | dry | dry | dry | dry | dry | dry |
| | ink density | high | high | high | high | very high | very high | high | very high | very high | high |
| | peeling | no | no | no | no | no | no | no | no | no | no |
| TOTAL EVALUATION | | ○ | ○ | ○ | ○ | ◎ | ◎ | ○ | ◎ | ◎ | ○ |

TABLE 3

| | | Example | | | | | | | | | |
|---|---|---|---|---|---|---|---|---|---|---|---|
| | | 21 | 22 | 23 | 24 | 25 | 26 | 27 | 28 | 29 | 30 |
| COM-POUND-ING | water-absorbable urethane resin (parts) | 100 | 100 | 100 | 100 | 100 | 100 | 100 | 100 | 100 | 100 |
| | silica (parts) | 600 | | | | 300 | 300 | 300 | | | |
| | collagen (parts) | | 600 | | | 300 | | | 300 | 300 | |
| | cross-linking acrylate (parts) | | | 400 | | | 350 | | | 350 | 350 |
| | calcium carbonate (parts) | | | | 600 | | | 300 | 300 | | 300 |
| INK AB-SORB-ING LYR. | thickness ($\mu$m) | 30 | 20 | 20 | 30 | 30 | 30 | 30 | 20 | 30 | 30 |
| | wetting index (dyn/cm) | 54 or more | 54 or more | 54 or more | 54 or more | 54 or more | 54 or more | 54 or more | 54 or more | 54 or more | 54 or more |
| | water vapor perme-ability ($g/m^2$) | 9800 | 9500 | 7000 | 1900 | 9600 | 10500 | 9500 | 5700 | 7500 | 4200 |
| | contact angle | 0° | 5° | 0° | 40° | 2° | 0° | 10° | 28° | 2° | 22° |
| EVAL-UA-TION | surface state of coating surface | un-even | un-even | un-even | un-even | un-even | un-even | un-even | un-even | un-even | un-even |
| | adhesive property to base | not good | not good | not good | not good | not good | not good | not good | not good | not good | not good |
| | ink conform-ability (bleeding and repelling) | very good | very good | good | good | good | good | good | good | good | good |
| | ink dryability | dry | dry | dry | dry | dry | dry | dry | dry | dry | dry |

TABLE 3-continued

| | | Example | | | | | | | | | |
|---|---|---|---|---|---|---|---|---|---|---|---|
| | | 21 | 22 | 23 | 24 | 25 | 26 | 27 | 28 | 29 | 30 |
| | ink density | very high | very high | high | high | very high | high | very high | high | high | high |
| | peeling | yes | yes | yes | yes | yes | yes | yes | yes | yes | yes |
| TOTAL EVALUATION | | Δ | Δ | Δ | Δ | Δ | Δ | Δ | Δ | Δ | Δ |

TABLE 4

| | | Comparative Example | | | | | | | | |
|---|---|---|---|---|---|---|---|---|---|---|
| | | 1 | 2 | 3 | 4 | 5 | 6 | 7 | 8 | 9 |
| COMPOUNDING | water-absorbable urethane resin (parts) | 100* | 100 | 100 | 100 | 100 | 100 | 100 | 100* | — |
| | silica (parts) | | 25 | 10 | | | | 10 | | — |
| | collagen (parts) | | | | 10 | | | | | — |
| | cross-linking acrylate (parts) | | | | | 10 | | | | — |
| | calcium carbonate (parts) | | | | | | 10 | 10 | 30 | — |
| INK ABSORBING LYR. | thickness ($\mu$m) | 30 | 30 | 30 | 30 | 30 | 30 | 30 | 30 | — |
| | wetting index (dyn/cm) | 32 | 37 | 38 | 37 | 41 | 35 | 38 | 42 | 32 |
| | water vapor permeability (g/m$^2$) | 300 | 1800 | 1500 | 1200 | 1200 | 1400 | 1000 | 500 | 100 or less |
| | contact angle | 120° | 60° | 50° | 60° | 54° | 65° | 61° | 46° | 102° |
| EVALUATION | surface state of coating surface | good | good | good | good | good | good | good | good | — |
| | adhesive property to base | good | good | good | good | good | good | good | good | — |
| | ink conformability (bleeding and repelling) | repellent | repellent | repellent | repellent | repellent | repellent | repellent | bleeding | repellent |
| | ink dryability | undry | undry | undry | undry | undry | undry | undry | undry | undry |
| | ink density | low | low | low | low | low | low | low | low | low# |
| | peeling | yes | yes | yes | yes | yes | yes | no | yes | yes |
| TOTAL EVALUATION | | X | X | X | X | X | X | X | X | X |

wherein the mark * shows that ester polyol is used instead of water-absorbable urethane resin and the mark # shows that inconsistencies in the ink density occur.

<Evaluations of Examples and Comparative Examples>

Physical Property Measuring Tests

As for each of the above Examples and Comparative Examples, the contact angle, the wetting index and the water vapor permeability of the ink absorbing material layer are measured.

(Contact Angle)

The contact angle is measured, by the liquid drop method using a pure water, at ordinary temperature after a lapse of ten seconds from a liquid drop. A contact angle meter used for the measurement is a FACE contact angle meter produced by Kyowa Kaimen Kagaku Kabushiki Kaisha.

(Wetting Index)

The wetting index is measured in compliance with "Testing method of wettability of polyethylene and polypropylene films" defined by JIS-K-6768. The standard solution is a mixture liquid of formamide and ethylene glycol monoethyl ether. The measurement is made in the temperature and moisture condition that the temperature is 23±2° C. and the relative humidity is 50±5%. The wetting test will be specifically described next.

Preceding treatment of test piece

Each of test pieces is left under the above temperature and moisture condition for six hours or more, and is subjected to the test after reaching an equilibrium of the temperature and moisture condition.

Test tool (swab stick)

For the test, swab sticks each formed by wrapping absorbent cotton around the tip end of a stick of approximately 1 mm diameter are used. The amount of absorbent cotton is approximately 15 to 20 mg. The absorbent cotton is evenly wrapped around the tip end of the stick so as to have a length of at least 15 mm.

Standard solution

As the standard solution, liquids obtained by mixing a slight amount of high-colorability dye with the respective mixture liquids made at rates shown in Table 5 are used. Formamide and ethylene glycol monoethyl ether used in the test are both high-grade products with a high purity. As the colorant, Victoria pure blue BO is used and its density is preferably 0.03% or less.

TABLE 5

| Formamide (volume %) | Ethylene glycol monoethyl ether (volume %) | Wetting index (surface tension) (dyn/cm) |
|---|---|---|
| 0 | 100 | 30 |
| 2.5 | 97.5 | 31 |
| 10.5 | 89.5 | 32 |
| 19.0 | 81.0 | 33 |
| 26.5 | 73.5 | 34 |
| 35.0 | 65.0 | 35 |
| 42.5 | 57.5 | 36 |
| 48.5 | 51.5 | 37 |
| 54.0 | 46.0 | 38 |
| 59.0 | 41.0 | 39 |
| 63.5 | 36.5 | 40 |
| 67.5 | 32.5 | 41 |
| 71.5 | 28.5 | 42 |
| 74.7 | 25.3 | 43 |
| 78.0 | 22.0 | 44 |
| 80.3 | 19.7 | 45 |
| 83.0 | 17.0 | 46 |
| 87.0 | 13.0 | 48 |
| 90.7 | 9.3 | 50 |
| 93.7 | 6.3 | 52 |
| 96.5 | 3.5 | 54 |
| 99.0 | 1.0 | 56 |

Test method

The swab stick is immersed in the standard solution to an extent that a liquid drop does not flow out of the swab stick, is put onto a test piece in a horizontal position and is moved in one direction thereby applying the standard solution to the test piece. The standard solution is applied to the test piece such that an applied liquid layer becomes as wide as possible and the application area is approximately 6 $cm^2$. The application of the standard solution is conducted within 0.5 seconds.

Determination of wetting index

The wetting index is determined with respect to the liquid layer after a lapse of two seconds from the application of the standard solution. When the liquid layer keeps a state as applied for two seconds or more without causing breakage, it is determined that the test piece is wet. Also when the liquid layer causes slight shrinkage at its peripheries, it is determined that the test piece is wet.

If the wetting state is kept for two seconds or more, the test proceeds to the application of another standard solution having a one level higher surface tension. On the other hand, if the liquid layer causes breakage within two seconds, the test proceeds to the application of another standard solution having a one level lower surface tension. Such operations are repeatedly conducted until a proper standard solution having a composition nearest to the composition at which the surface of the test piece can be put into a wetting state for just two seconds can be selected. In this manner, the surface tension (dyn/cm) of the standard solution finally selected is the wetting index of the test piece.

(Water Vapor Permeability)

The water vapor permeability is measured in compliance with "Testing method for determination of the water vapor permeability of water vaporproof packaging materials (dish method)" defined by JIS-Z-0208. The temperature and moisture condition is Condition B (temperature: 40±0.5° C., relative moisture: 90±2%). Since the value of the water vapor permeability varies depending upon the thickness of a specimen, the water vapor permeability P' measured in compliance with the requirements of JIS-Z-0208 is converted to the water vapor permeability P at a specimen thickness of 0.1 mm. This conversion is made based on the following equation $$P=d\times P'/0.1$$

wherein d is a thickness (mm) of a specimen used for measurement of the water vapor permeability defined by JIS-Z-0208. The measuring method of the water vapor permeability P' is as follows.

Water vapor permeation cup

Figure 3:
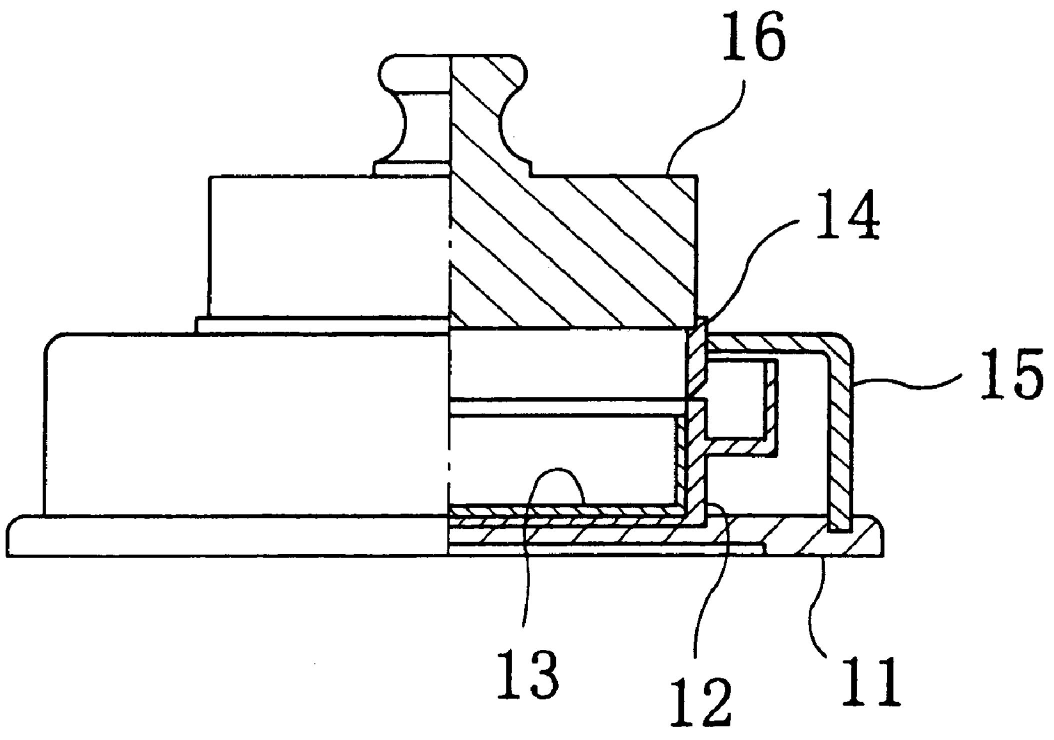
FIG. 3 is a cross section showing an instrument for measuring water vapor permeability.

An example of a water vapor permeation cup used for the above test is shown in FIG. 3. In this figure, a reference numeral 11 denotes a cup rack made of brass casting, a reference numeral 12 denotes a cup made of aluminium, a reference numeral 13 denotes a dish made of glass, a reference numeral 14 denotes a ring made of aluminium (diameter: 60 mm), a reference numeral denotes a guide made of brass casting, and a reference numeral 16 denotes a weight made of brass casting and having a mass of approximately 500 g.

Test method (1) The cup 12 is washed, is dried and is then heated to 30° C. to 40° C. The dish 13 on which a moisture absorbing agent (calcium chloride anhydrate having a particle size of 590 μm to 2380 μm) is put is set into the cup 12, and is then put on the cup rack 11 held in a horizontal position. At the time, the surface of the moisture absorbing agent is made as plane as possible such that the distance between the moisture absorbing agent and the bottom surface of the test piece is approximately 3 mm.

(2) The test piece is formed in a circle having a diameter approximately 10 mm larger than the inner diameter of the cup 12. The test piece is concentrically put on the cup 12. The cup rack 11 is covered with the guide 15. The ring 14 is pressed in along the guide 15 until the test piece is brought into intimate contact with the top edge of the cup 12. Then, the weight 15 is put on the ring 14. Thereafter, the guide 15 is vertically moved upward so as not to move the ring 14 and is then removed.

(3) A melted sealer (wax or the like) is made to flow into a groove provided at the peripheral edge of the cup 12 while the cup 12 is rotated in a horizontal position, so that the edge of the test piece is sealed. After the sealer solidifies, the weight 16 and the cup rack 11 are removed and the test piece is set into an apparatus for producing a constant-temperature and constant-moisture atmosphere in the temperature and moisture condition B. After a lapse of 16 hours or more in this condition, the test piece is taken out of the apparatus and is brought into a condition of equilibrium at a room temperature. In this condition, the mass of the test piece is measured by a chemical balance.

(4) The test piece is set into the apparatus for producing a constant-temperature and constant-moisture atmosphere again. Then, at suitable time intervals, the cup is taken out of the apparatus and the mass of the cup is measured to obtain an increase in the mass of the cup. At the time, the increase in the mass of the cup per unit time between successive two measurements is obtained. The test is continued until the increase in the mass of the cup reaches a constant value within 5%.

(5) The water vapor permeability P' is calculated in accordance with the following formula:

$$P'(g/m^2\cdot 24\ h)=240\times m\div(t\times s)$$

wherein s is a water vapor permeation area ($cm^2$), t is the total time of last two measurement intervals in the test (h) and m is the total increases in the mass of the cup at last two measurement intervals in the test (mg).

Performance Evaluations

Each of the above-mentioned Examples and Comparative Examples is subjected to evaluations of the following categories.

<Coating surface state>

The surface state of the ink absorbing material layer is visually evaluated. The criteria for evaluation are as follows. When the surface is smooth and has no asperity doing harm to printing, the evaluation result is “good”. On the other hand, when the surface has such asperities, the evaluation result is “uneven”.

<Adhesive property between base layer and ink absorbing material layer>

The surface of the ink absorbing material layer is cut in a grid pattern by a cutter such that 100 vertical cut lines and 100 horizontal cut lines are formed in every 1 mm, a cellophane tape is adhered to the cut surface of the ink absorbing material layer, and the cellophane tape is abruptly peeled off in a direction of 90° with respect to the surface of the ink absorbing material layer. Thereby, the adhesive property between the base layer and the ink absorbing material layer is evaluated. The criteria for evaluation are as follows. When the ink absorbing material layer is not peeled off, the evaluation result is “good”. On the other hand, when the ink absorbing material layer is peeled off, the evaluation result is “not good”.

<Ink conformability (bleeding and repelling)>

Printing is performed onto a printing surface (ink absorbing material layer) of each of the above-mentioned Examples and Comparative Examples by an ink jet printer using : a color ink, and visual evaluation is made about the extent to which the printed surface causes bleeding of ink and repelling of ink. The criteria for evaluation are as follows. When the printed surface causes neither repelling of ink nor bleeding of ink, the evaluation result is classified into two levels of “very good” and “good”. When the printed surface causes repelling of ink, the evaluation result is “repellent”. When the printed surface causes bleeding of ink, the evaluation result is “bleeding”.

The color ink used in the test is a water-base ink composition formed of pigment, a dispersing agent and a solvent. The dispersing agent is a polymer including as a main ingredient alkylester acrylate which has a lipophilic part and a hydrophilic part. The solvent is a mixture of water and a nonvolatile hydrophilic organic solvent. As the ink jet printer, RJ-1300 produced by MUTOH KOGYO KABUSHIKI KAISHA is used.

<Ink dryability>

After a lapse of 10 minutes from the printing by the ink jet printer, the drying condition of the printed surface is evaluated by a tactile impression. The criteria for evaluation are as follows. When the printed surface is dry, the evaluation result is “dry”. On the other hand, when the printed surface is not yet dry, the evaluation result is “undry”.

<Ink density (printing density)>

After printing by the ink jet printer, the ink density and inconsistencies in ink density of the printed surface are visually evaluated. The criteria for evaluation are as follows. The ink density is classified into three levels of “very high”, “high” and “low”. The test piece having inconsistencies in ink density is shown in the mark #.

<Ink fixativity>

After a lapse of 10 minutes from the printing by the ink jet printer, a cellophane tape is adhered onto the printed surface, the printed surface is rubbed ten times through the cellophane tape by the finger, and the cellophane tape is then peeled off. At the time, visual evaluation is made about whether the ink is left on the laminated film. The criteria for evaluation are as follows. When the ink is left on the laminated film, this means that peeling does not occur, i.e., the evaluation result is “no”. On the other hand, when the ink is not left on the laminated film, this means that peeling occurs, i.e., the evaluation result is “yes”.

<Total Evaluation>

The total evaluation is made in a manner of considering all the evaluation results of the above six categories. A mark ◎ shows that the total evaluation is very good, a mark ○ shows that the total evaluation is good next to the mark ◎, a mark Δ shows that the total evaluation is a little bad, and a mark X shows that the total evaluation is worse than the mark Δ.

The physical properties and evaluation results of the above Examples and Comparative Examples are shown in Table 1 to 4 together with respective compounding ratios thereof. “54 or more” in the column of wetting index in Tables 1 to 4 shows that since the liquid layer is held in a wetting state without shrinkage even when the standard solution having a surface tension of 54 dyn/cm is applied to the ink absorbing material layer, it can be predicted that also when the standard solution having a higher surface tension is applied to the ink absorbing material layer, the layer is sufficiently “wet”.

(Evaluation Results)

Relationship between physical properties and evaluation results

In Tables 6 to 8, the above-mentioned Examples and Comparative Examples are sorted in the descending order of the contact angle and are arranged in another way. The compounding ratios are omitted. In the column of specimen, Example is abbreviated as “Ex.” and Comparative Example is abbreviated as "Com.". As for the evaluation results, "very good" is expressed as "best".

TABLE 6

| | Com. 1 | Com. 9 | Com. 6 | Com. 7 | Com. 2 | Com. 4 | Com. 5 |
|---|---|---|---|---|---|---|---|
| contact angle | 120 | 102 | 65 | 61 | 60 | 60 | 54 |
| wetting index | 32 | 32 | 35 | 38 | 37 | 37 | 41 |
| water vapor perme-ability | 300 | 100 or less | 1400 | 1000 | 1800 | 1200 | 1200 |
| surface state | good | — | good | good | good | good | good |
| adhesive property to base | good | — | good | good | good | good | good |
| ink conform-ability | repel-lent | repel-lent | repel-lent | repel-lent | repel-lent | repel-lent | repel-lent |
| ink dryability | undry | undry | undry | undry | undry | undry | undry |
| ink density | low | low# | low | low | low | low | low |
| peeling | yes | yes | yes | no | yes | yes | yes |
| TOTAL EVALUATION | X | X | X | X | X | X | X |

| | Com. 3 | Ex. 11 | Com. 8 | Ex. 7 | Ex. 17 | Ex. 4 | Ex. 24 |
|---|---|---|---|---|---|---|---|
| contact angle | 50 | 47 | 46 | 45 | 41 | 40 | 40 |
| wetting index | 38 | 51 | 42 | 52 | 54 or more | 45 | 54 or more |
| water vapor perme-ability | 1500 | 1600 | 500 | 1500 | 1700 | 1500 | 1900 |
| surface state | good | good | good | good | good | good | uneven |
| adhesive property to base | good | good | good | good | good | good | not good |
| ink conform-ability | repel-lent | good | bleed-ing | good | good | good | good |
| ink dryability | undry | dry | undry | dry | dry | dry | dry |
| ink density | low | high | low | high | high | high | high |
| peeling | yes | no | yes | no | no | no | yes |
| TOTAL EVALUATION | X | ○ | X | ○ | ○ | ○ | Δ |

TABLE 7

| | Ex. 2 | Ex. 18 | Ex. 12 | Ex. 28 | Ex. 5 | Ex. 13 | Ex. 9 |
|---|---|---|---|---|---|---|---|
| contact angle | 36 | 30 | 30 | 28 | 25 | 25 | 23 |
| wetting index | 52 | 54 or more | 54 or more | 54 or more | 54 or more | 54 or more | 54 or more |
| water vapor perme-ability | 2600 | 8200 | 4200 | 5700 | 5000 | 8700 | 6200 |
| surface state | good | good | good | uneven | good | good | good |
| adhesive property to base | good | good | good | not good | good | good | good |
| ink conform- | good | best | good | good | best | good | best |

TABLE 7-continued

| | | | | | | | |
|---|---|---|---|---|---|---|---|
| ability | | | | | | | |
| ink dryability | dry | dry | dry | dry | dry | dry | dry |
| ink density | high | very high | high | high | very high | high | high |
| peeling | no | no | no | yes | no | no | no |
| TOTAL EVALUATION | ○ | ◎ | ○ | Δ | ◎ | ○ | ○ |

| | Ex. 30 | Ex. 19 | Ex. 3 | Ex. 8 | Ex. 16 | Ex. 6 | Ex. 15 |
|---|---|---|---|---|---|---|---|
| contact angle | 22 | 21 | 20 | 20 | 20 | 18 | 18 |
| wetting index | 54 or more | 54 or more | 54 or more | 54 or more | 54 or more | 54 or more | 54 or more |
| water vapor perme-ability | 4200 | 4800 | 3000 | 8500 | 6300 | 3500 | 8400 |
| surface state | uneven | good | good | good | good | good | good |
| adhesive property to base | not good | good | good | good | good | good | good |
| ink conform-ability | good | best | good | best | best | good | best |
| ink dryability | dry | dry | dry | dry | dry | dry | dry |
| ink density | high | very high | high | very high | very high | high | very high |
| peeling | yes | no | no | no | no | no | no |
| TOTAL EVALUATION | Δ | ◎ | ○ | ◎ | ◎ | ○ | ◎ |

TABLE 8

| | Ex. 14 | Ex. 1 | Ex. 20 | Ex. 10 | Ex. 27 | Ex. 22 | Ex. 25 |
|---|---|---|---|---|---|---|---|
| contact angle | 17 | 16 | 15 | 10 | 10 | 5 | 2 |
| wetting index | 54 or more | 54 or more | 54 or more | 54 or more | 54 or more | 54 or more | 54 or more |
| water vapor perme-ability | 6500 | 7000 | 6800 | 7500 | 9500 | 9500 | 9600 |
| surface state | good | good | good | good | un-even | un-even | un-even |
| adhesive property to base | good | good | good | good | not good | not good | not good |
| ink conform-ability | good | best | good | best | good | best | good |
| ink dryability | dry | dry | dry | dry | dry | dry | dry |
| ink density | high | very high | high | very high | very high | very high | very high |
| peeling | no | no | no | no | yes | yes | yes |
| TOTAL EVALUATION | ○ | ◎ | ○ | ◎ | Δ | Δ | Δ |

| | Ex. 29 | Ex. 21 | Ex. 23 | Ex. 26 |
|---|---|---|---|---|
| contact angle | 2 | 0 | 0 | 0 |
| wetting index | 54 or more | 54 or more | 54 or more | 54 or more |
| water vapor perme-ability | 7500 | 9800 | 7000 | 10500 |
| surface | uneven | uneven | uneven | uneven |

TABLE 8-continued

| | | | | |
|---|---|---|---|---|
| state | | | | |
| adhesive property to base | not good | not good | not good | not good |
| ink conform-ability | good | best | good | good |
| ink dryability | dry | dry | dry | dry |
| ink density | high | very high | high | high |
| peeling | yes | yes | yes | yes |
| TOTAL EVALUATION | Δ | Δ | Δ | Δ |

If the contact angle is over 50 degrees, the evaluation of printing performance is not good even in the case of having a relatively large wetting index of 41 dyn/cm and a relatively large water vapor permeability of 120 g/m$^2$, as shown in Comparative Example 5 in Table 6. Since the Comparative Example has a poor conformability to the water-base ink and a poor ink dryability, its ink density is low and its ink fixativity is insufficient. On the contrary, when the contact angle is 50 degrees or less, approximately good evaluation results are obtained.

In the case of Comparative Example 5, since the wetting index is relatively large even though the contact angle is large, this offers the prospect of exhibiting a good wettability to the water-base ink. Further, since the water vapor permeability is relatively large, this offers the prospect of exhibiting a good dryability to the water-base ink. However, Comparative Example 5 cannot obtain such expected effects. Though the reason for this is not certain, it can be said that the actual wettability and dryability of the ink absorbing material to the water-base ink cannot be determined by only the wetting index and the water vapor permeability since the water-base ink itself is a relatively complex composition obtained by mixing materials having various kinds of characteristics. Accordingly, it can be said that the actual wettability and dryability cannot satisfactorily be obtained unless a physical property condition of "the contact angle" having a relation with both the wettability and the water absorbability is considered in addition to the wetting index and the water vapor permeability.

On the other hand, even when the contact angle is 50 degrees or less, if the wetting index is below 40 dyn/cm as shown in Comparative Example 3, this provides a poor conformability to the water-base ink. In the case of Comparative Example 3, the ink dryability is also not good. On the contrary, if the wetting index is over 40 dyn/cm, even when the contact angle is relatively large, for example, 40 to 50 degrees, good evaluation results about the conformability to the water-base ink are obtained (See Examples 11, 7, 17 and 4).

As is seen from the above, also in the case where the contact angle is 50 degrees or less, it can be said that the wetting index is preferable 40 dyn/cm or more and more preferably 45 dyn/cm or more in order to secure the wettability to the water-base ink.

Further, even when the contact angle is 50 degrees or less and the wetting index is 40 dyn/cm or more, if the water vapor permeability is below 800 g/m$^2$, this provides a poor dryability to the water-base ink and ink peeling. On the contrary, if the water permeability is over 800 g/m$^2$, even when the contact angle is relatively large, for example, 40 to 50 degrees, good evaluation results about the dryability to the water-base ink are obtained (See Examples 11, 7, 17 and 4).

As is seen from the above, also in the case where the contact angle is 50 degrees or less, it can be said that the water permeability is preferably 800 g/m$^2$ or more and more preferably 1500 g/m$^2$ or more in order to secure the dryability to the water-base ink.

In the case where the contact angle is 40 degrees or less, particularly in the case where the contact angle is 30 degrees or less as shown in examples in Tables 7 and 8, most of the examples obtain very good evaluation results about the conformability and the dryability to the water-base ink. However, in order to have a small contact angle, it is necessary to use a water absorbing agent such as silica other than resin as main ingredient of the ink absorbing material and other fillers. As such fillers are increased, the dispersibility becomes worse. This readily induces a defective coating and provides a poor adhesive property between the ink absorbing material layer and the base layer, resulting in ease to cause ink peeling. The ink peeling in this case is a phenomenon that the ink peels from the base layer together with the ink absorbing material layer. Accordingly, it can be said that the contact angle is preferably 10 degrees or more.

The above problem on dispersibility can be said similarly also in a relation with the water vapor permeability. That is to say, as the water vapor permeability increases, the dryability to the water-base ink becomes better. However, in order to increase the water vapor permeability, it is necessary to use the above-mentioned water absorbing agent in large quantity. This induces poor dispersion. Accordingly, it can be said that it is less significant to prepare the ink absorbing material so as to set the water vapor permeability at a value of 20000 dyn/cm or more and further at a value of 10000 dyn/cm or more.

EXAMPLES 31 TO 35 AND COMPARATIVE EXAMPLES 10 TO 14

As shown in Tables 9A and 9B, these Examples and Comparative Examples are each obtained in the same manner as in Example 1 by changing the type and the compounding ratio of the water absorbing agent of the ink absorbing material. The values in columns in Examples of Table 9A and Comparative Examples of Table 9B each show a compounding ratio (weight parts) and the compounding ratio is a solids content excluding a solvent and the like. The thickness of the ink absorbing material layer in each of Examples of Table 9A and Comparative Examples of Table 9B is 30 $\mu$m.

In Tables 9A and 9B, the following types of water absorbing materials are used.

Porous calcium carbonate: CALLITE-KT produced by Kabushiki Kaisha Shiraishi Chuo Kenkyusho Whisker-formed calcium carbonate: WHISCAL produced by Maruo Calcium Co., Ltd.

Water-swellable mica: SOMASHIF ME-100 produced by CO-OP CHEMICAL CO., LTD.

Talc: LMG-100 produced by Fuji Talc Kogyo Kabushiki Kaisha

Zeolite: TOYOBUILDER produced by TOSOH CORPORATION

Magnesium oxide: MICROMAG 5-150 produced by Kyowa Chemical Industry Co., Ltd.

Barium sulfate: BF-20 produced by Sakai Chemical Industry Co., Ltd.

TABLE 9A

| | Examples | | | | |
|---|---|---|---|---|---|
| | 31 | 32 | 33 | 34 | 35 |
| water-absorbable resin | 100 | 100 | 100 | 100 | 100 |
| Porous calcium carbonate | 120 | | | | |
| Whisker-formed calcium carbonate | | 120 | | | |
| Water swellable mica | | | 300 | | |
| Talc | | | | 300 | |
| Zeolite | | | | | 300 |
| Precipitated calcium carbonate | | | | | |
| Magnesium oxide | | | | | |
| Barium sulfate | | | | | |
| Adhesive property to base layer | good | good | good | good | good |
| Ink conformability (bleeding and repelling) | best | best | best | good | best |
| Ink dryability | dry | dry | dry | dry | dry |
| Ink density | very high | high | high | high | very high |
| Ink peeling | no | no | no | no | no |
| TOTAL EVALUATION | ◎ | ○ | ○ | ○ | ◎ |

TABLE 9B

| | Comparative Examples | | | | |
|---|---|---|---|---|---|
| | 10 | 11 | 12 | 13 | 14 |
| water-absorbable resin | 100 | 100 | 100 | 100 | 100 |
| Porous calcium carbonate | | | | 30 | 600 |
| Whisker-formed calcium carbonate | | | | | |
| Water swellable mica | | | | | |
| Talc | | | | | |
| Zeolite | | | | | |
| Precipitated calcium carbonate | 120 | | | | |
| Magnesium oxide | | 120 | | | |
| Barium sulfate | | | 300 | | |
| Adhesive property to base layer | good | good | good | good | not good |
| Ink conformability (bleeding and repelling) | repel-lent | repel-lent | good | repel-lent | good |
| Ink dryability | undry | undry | undry | undry | dry |
| Ink density | low | low | low | low | high |
| Ink peeling | yes | yes | yes | yes | yes |
| TOTAL EVALUATION | X | X | X | X | X |

<Evaluations of Examples and Comparative Examples>

Examples 31 to 35 and Comparative Examples 10 to 14 are subjected to performance evaluations in the same manner as described earlier. The evaluation results are shown in Tables 9A and 9B.

Examples 31 to 35 obtain good evaluation results about all the evaluation categories. Particularly, Examples 31 and obtain very good evaluation results in terms of the ink conformability and the ink density and obtain highest total evaluations.

On the other hand, in Comparative Example 10 using precipitated calcium carbonate as a water absorbing agent, though the adhesive property between the ink absorbing material layer and the base layer is good, bad evaluation results are obtained in terms of the printing performance, i.e., the ink conformability, the ink dryability, the ink density and the ink fixativity. Also in Comparative Example 11 using magnesium oxide as a water absorbing agent, good evaluation results are not obtained in terms of the ink conformability, the ink dryability and the ink fixativity. Also in Comparative Example 12 using barium sulfate as a water absorbing agent, though the adhesive property to the base layer and the ink conformability are good, satisfactory evaluation results are not obtained in terms of the ink dryability, the ink density and the ink fixativity.

Comparative Example 13 uses porous calcium carbonate as a water absorbing agent as in Example 31. However, since the compounding ratio of porous calcium carbonate is small, though the adhesive property to the base layer is good, it is not sufficient to increase the swelling function of the ink absorbing material layer through the use of the water absorbing agent. As a result, a satisfactory printing performance is not obtained. Further, Comparative Example 14 uses the same water absorbing agent (porous calcium carbonate) as used in Example 31 in large quantity. Thereby, though the obtained printing performance is good, the adhesive property to the base layer is poor.

We claim:

1. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of collagen as the water absorbing agent are mixed with 100 weight parts of polyurethane resin synthesized by using polyether polyol including polyethylene oxide.

2. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 300 weight parts of cross-linking acrylate as the water absorbing agent are mixed with 100 weight parts of polyurethane resin synthesized by using polyether polyol including polyethylene oxide.

3. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30–500 weight parts of calcium carbonate as the water absorbing agent are mixed with 100 weight parts of polyurethane resin synthesized by using polyether polyol including polyethylene oxide.

4. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30–500 weight parts of mixture of silica and collagen as the water absorbing agent are mixed with 100 weight parts of polyurethane resin synthesized by using polyether polyol including polyethylene oxide.

5. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of silica and cross-linking acrylate as the water absorbing agent are mixed with 100 weight parts of polyurethane resin synthesized by using polyether polyol including polyethylene oxide, and the amount of cross-linking acrylate in mixture is 300 weight parts or less.

6. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of silica and calcium carbonate as the water absorbing agent are mixed with 100 weight parts of polyurethane resin synthesized by using polyether polyol including polyethylene oxide.

7. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30–500 weight parts of mixture of collagen and cross-linking acrylate as the water absorbing agent are mixed with 100 weight parts of polyurethane resin synthesized by using polyether polyol including polyethylene oxide, and the amount of cross-linking acrylate in mixture is 300 weight parts or less.

8. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of collagen and calcium carbonate as the water absorbing agent are mixed with 100 weight parts of polyurethane resin synthesized by using polyether polyol including polyethylene oxide.

9. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of cross-linking acrylate and calcium carbonate as the water absorbing agent are mixed with 100 weight parts of polyurethane resin synthesized by using polyether polyol including polyethylene oxide, and the amount of cross-linking acrylate in the mixture is 300 weight parts or less.

10. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of silica, collagen and cross-linking acrylate as the water absorbing agent are mixed with 100 weight parts of polyurethane resin synthesized by using polyether polyol including polyethylene oxide, and the amount of cross-linking acrylate in the mixture is 300 weight parts or less.

11. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of silica, collagen and calcium carbonate as the water absorbing agent are mixed with 100 weight parts of polyurethane resin synthesized by using polyether polyol including polyethylene oxide.

12. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of collagen, cross-linking acrylate and calcium carbonate as the water absorbing agent are mixed with 100 weight parts of polyurethane resin synthesized by using polyether polyol including polyethylene oxide, and the amount of cross-linking acrylate in the mixture is 300 weight parts or less.

13. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weight parts of mixture of silica, cross-linking acrylate and calcium carbonate as the water absorbing agent are mixed with 100 weight parts of polyurethane resin synthesized by using polyether polyol including polyethylene oxide, and the amount of cross-linking acrylate in the mixture is 300 weight parts or less.

14. A water-base ink absorbing material adapted to be provided on a surface of a base to receive a water-base ink, said water-base ink absorbing material including a water absorbing agent and polyurethane resin synthesized by using polyether polyol including polyethylene oxide, wherein 30 to 500 weigh parts of mixture of silica, collagen, cross-linking acrylate and calcium carbonate as the water absorbing agent are mixed with 100 weight parts of polyurethane resin synthesized by using polyether polyol including polyethylene oxide, and the amount of cross-linking acrylate in the mixture is 300 weight parts or less.

15. The water-base ink absorbing material according to any one of claims 1 to 14, wherein the thickness of the water-base ink absorbing material is 5 $\mu$m to 200 $\mu$m.

16. A laminated film comprising a base layer and a layer which is made of the water-base ink absorbing material according to any one of claims 1 to 14 and is formed on a surface of the base layer.

17. The laminated film according to claim 16, wherein a pressure sensitive adhesive layer is formed on the back surface of the base layer.

* * * * *

UNITED STATES PATENT AND TRADEMARK OFFICE
CERTIFICATE OF CORRECTION

PATENT NO. : 6,040,035

DATED : 03/21/00

INVENTOR(S) : Hiroki Satoh, Noriko Shoyama, Yoshio Taguchi

It is certified that error appears in the above-identified patent and that said Letters Patent are hereby corrected as shown below:

In the Title:

Please replace: WATER-COLOR INK ABSORBING MATERIAL AND LAMINATED FILM HAVING LAYER OF THE ABSORBING MATERIAL With: WATER-BASE INK ABSORBING MATERIAL AND LAMINATED FILM HAVING WATER-BASE IN ABSORBING LAYER Signed and Sealed this Twenty-fourth Day of April, 2001

Attest:

NICHOLAS P. GODICI

Attesting Officer

Acting Director of the United States Patent and Trademark Office